United States Patent
Tsuboi et al.

[19]

[11] Patent Number: 6,149,775
[45] Date of Patent: Nov. 21, 2000

[54] METHOD FOR PREPARING SINGLE LAYER CARBON NANO-TUBE

[75] Inventors: Toshiyuki Tsuboi, Mobara; Haruhiro Kobayashi, Tokyo; Kenji Nawamaki, Mobara, all of Japan

[73] Assignee: Futaba Denshi Kogyo Kabushiki Kaisha, Mobara, Japan

[21] Appl. No.: 09/264,685

[22] Filed: Mar. 9, 1999

[30] Foreign Application Priority Data

Mar. 16, 1998 [JP] Japan .................................. 10-082409

[51] Int. Cl.$^7$ ........................................................ B01J 19/08
[52] U.S. Cl. ........................................ 204/173; 423/445 B
[58] Field of Search ......................... 204/173; 423/445 B

[56] References Cited

U.S. PATENT DOCUMENTS 5,830,326 11/1998 Ijima ........................................ 204/173

FOREIGN PATENT DOCUMENTS 017197325A 8/1995 Japan .

OTHER PUBLICATIONS

Chemical Abstract 1996: 24459 (no month available).

*Primary Examiner*—Kishor Mayekar
*Attorney, Agent, or Firm*—Oblon, Spivak, McClelland, Maier & Neustadt, P.C.

[57] ABSTRACT

There is provided a method for preparing a single layer carbon nano-tube stably and in high preparation efficiency. Helium is introduced from a gas inlet 19 while exhausting inside a vacuum chamber 11 by means of a rotary pump 12 to prepare an atmosphere of rare gas. DC arc discharge is established between a metal-added carbon electrode to which a single metal is added 13 and a metal-added carbon electrode to which a single metal the kind of which is different from that of the former metal is added 14 by the use of a discharge power source apparatus 17. Carbon and metals are evaporated from both electrodes, and the metals are alloyed to act as a catalyst to the carbon and the single layer carbon nano-tube is prepared.

6 Claims, 5 Drawing Sheets

METHOD FOR PREPARING SINGLE LAYER CARBON NANO-TUBE

BACKGROUND OF THE INVENTION

This invention relates to a method for preparing a single layer carbon nano-tube.

In recent years, a minute cylindrical fiber having a single cylindrical structure of not more than 3 nm outer diameter made of carbon, especially graphite, so-called carbon nano-tube has been noted. Such the carbon nano-tube has been conventionally prepared in such a manner as described below.

That is to say, in convention, DC arc discharge is generated between a pure carbon electrode as a cathode and a metal-added carbon electrode as an anode in an atmosphere of rare gas or mixed gas of rare gas with hydrocarbon. Then, evaporation of the electrode takes place at the anode. That is to say, the metal and the carbon evaporate at the same time from the anode. The evaporated carbon appears as soot in which a single layer nano-tube having nearly uniform outerdiameter is, eventually, contained, since the evaporated metal acts to the evaporated carbon as a catalyst.

It has been conventionally known that the preparation efficiency of the single layer carbon nano-tube increases extremely by adding two kinds of metal catalysts into the anode in the aforesaid method for preparing the single layer carbon nano-tube.

In the prior method for preparing the single layer nano-tube, a good deal of carbon evaporated from the electrode is build up on the cathode as deposits without becoming soot containing the single layer carbon nano-tube because of using DC arc discharge. There is, therefore, a problem that the yield of the single layer carbon nano-tube is small. Further, in the prior method, since the evaporation of carbon takes place at one electrode and does not take place at the other electrode, there is also a problem that the yield of soot containing the single layer carbon nano-tube is small.

And, the deposits build up on the cathode has electrical resistance different from that of materials of cathode, and further is not only apt to be distorted in its shape because of not being build up in the central portion of the cathode, but also brittle. And there is, therefore, a problem that discharge becomes unstable because of growth or omission of the deposits.

Furthermore, in the prior method, when plural metal catalysts are used, all the metal catalysts must be added to the anode, and, therefore, there is a problem that a preparation of the diode is difficult.

SUMMARY OF THE INVENTION

The object of this invention is to provide a process for preparing a single layer carbon nano-tube in high yield of preparation characterized in that a stable preparation of the single layer carbon nano-tube is possible and a quantity of preparation of soot containing the single layer carbon nano-tube is large, since evaporation of carbon takes place from both electrodes.

According to a first aspect of this invention, there is provided a method for preparing a single layer carbon nano-tube comprising generating arc discharge between two carbon electrodes to evaporate the carbon electrodes and generating soot containing the single layer carbon nano-tube in an atmosphere of a gas, characterized in that a metal-added carbon electrode to which more than two kinds of metals in all are added is used for one or both electrodes as the aforesaid two carbon electrodes and an alternating voltage is applied between the two electrodes to generate AC arc discharge.

According to a second aspect of this invention, there is provided a method for preparing a single layer carbon nano-tube described in the first aspect in which metals are added only to one carbon electrode of the aforesaid two carbon electrodes and the other carbon electrode is a pure carbon electrode.

According to a third aspect of this invention, there is provided a method for preparing a single layer carbon nano-tube described in the first aspect in which metals are added to both carbon electrodes of the aforesaid two carbon electrodes and at least one kind of metal of metals added to one carbon electrode is different in kind from that added to the other carbon electrode.

According to a fourth aspect of this invention, there is provided a method for preparing a single layer carbon nano-tube described in the first aspect in which metals are added to both carbon electrodes of the aforesaid two carbon electrodes and metals added to one carbon electrode and to the other carbon electrode are the same metals containing plural kinds of metals.

According to a fifth aspect of this invention, there is provided a method for preparing a single layer carbon nano-tube described in the first aspect in which a ratio of evaporation rate of the aforesaid metals from one carbon electrode of the aforesaid two carbon electrodes to evaporation rate of the aforesaid metals from the other carbon electrode of the aforesaid two carbon electrodes is changed by controlling discharge electric current flowing between the aforesaid two carbon electrodes.

According to a sixth aspect of this invention, there is provided a method for preparing a single layer carbon nano-tube described in the first aspect in which the aforesaid AC voltage is controlled so that the time during which the discharge electric current flows from one carbon electrode to the other carbon electrode of the aforesaid two carbon electrodes is lengthened than the time during which the discharge electric current flows from the other carbon electrode of the two carbon electrodes to one carbon electrode at each period.

As the aforesaid metals may be used nickel and iron, or nickel and yttrium oxide, or nickel and lanthanum (lanthanum oxide).

As the aforesaid gas may be used helium.

BRIEF DESCRIPTION OF THE DRAWINGS

For a more complete understanding of this invention may be had to the following detailed explanations in connection with the accompanying drawings, in which.

DESCRIPTION OF THE PREFERRED EMBODIMENTS

The preferred embodiments of this invention are described below.

Figure 1:
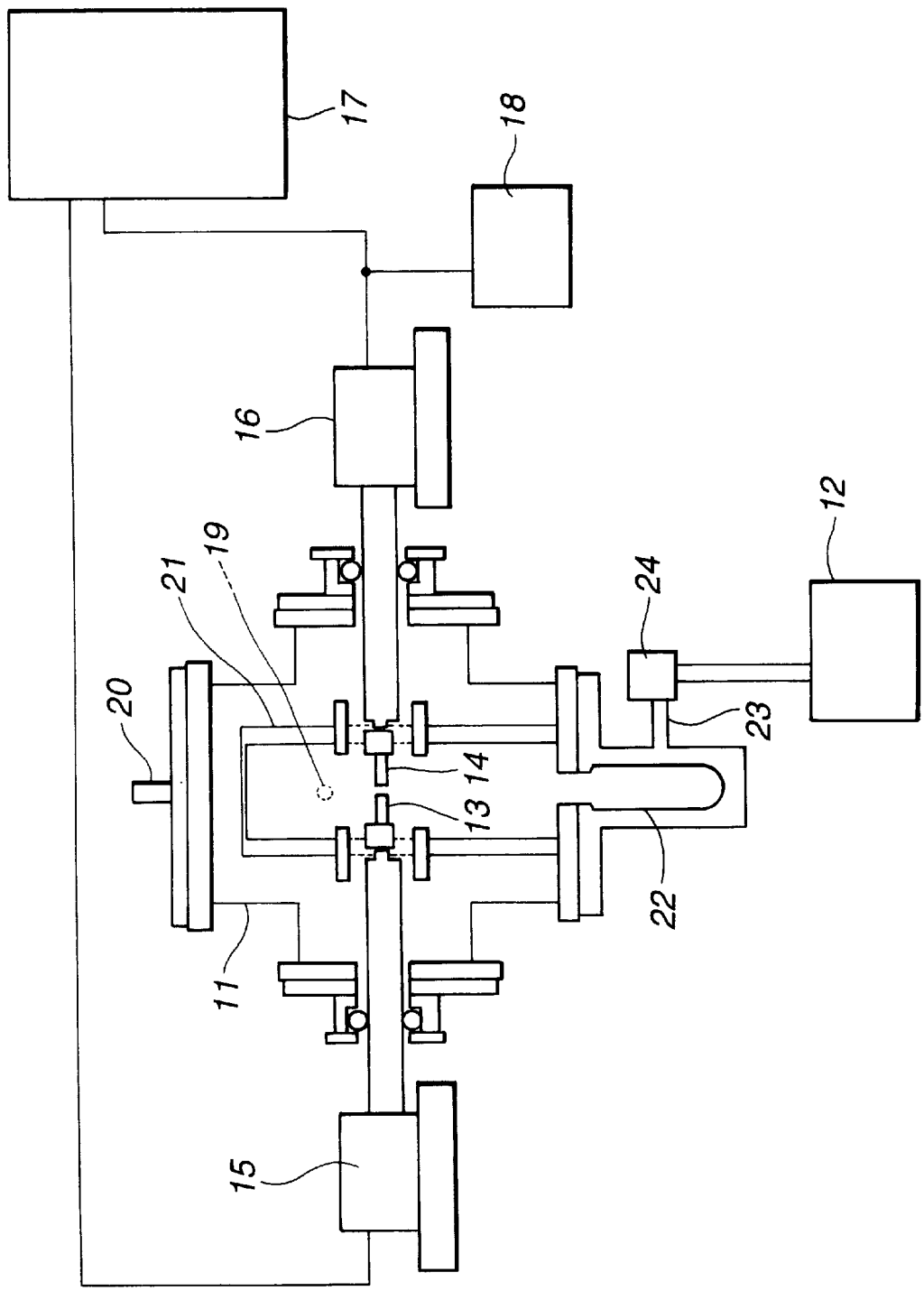
FIG. 1 is a schematic view showing an arc discharging apparatus to which this invention is applied.

FIG. 1 shows an arc discharging apparatus used in the first embodiment of this invention. The arc discharging apparatus comprises a vacuum chamber 11, a rotary pump 12 for drawing the vacuum to evacuate the chamber 11, metal-added carbon electrodes 13, 14 arranged oppositely in the vacuum chamber 11, position controlling apparatuses 15, 16 for changing a distance between these electrodes, a discharge power source 17 (used as both AC and DC) for applying a voltage between the electrodes 13, 14 to generate discharge and simultaneously for controlling a discharge current, and a digital oscilloscope tube for observing a waveform of discharge current.

The vacuum chamber 11 is provided with a gas inlet 19 (placed at the back of the FIG. 1) for introducing a gas into the vacuum chamber 11, and a peephole for observing a state of preparation of soot 20. And, inside of the vacuum chamber 11, a cooling tube 21 for cooling discharge space is placed and a soot recovering filter 22 for recovering soot generated by discharge is mounted near to an exhaust vent 23.

The rotary pump 12 is connected to the exhaust vent 23 in the vacuum chamber 11 through a vacuum valve 24 and the gas in the vacuum chamber 11 passes through the soot recovering filter 22 to exhaust from the exhaust vent 23.

The position controlling apparatuses 15, 16 are provided respectively with arms the tips of which are placed inside of the vacuum chamber 11. The electrodes 13, 14 are mounted to these tips of the arms. The position controlling apparatuses 15, 16 can move at least the tips of the arms from side to side in FIG. 1 and change the distance between the electrodes 13, 14. And, the position controlling apparatuses 15, 16 connect electrically the discharge power source 17 with the electrodes 13, 14.

The metal-added carbon electrodes 13, 14 are different from pure carbon electrodes, and one of two different kinds of metals except for main components is added thereto respectively. For example, nickel (Ni) is added to the electrode 13 and iron (Fe) is added to the electrode 14. Alternatively, nickel (Ni) is added to the electrode 13 and yttrium oxide ($Y_2O_3$) is added to the electrode 14.

Next, an explanation on a method for preparing the single layer carbon nano-tube is given with reference to the apparatus of FIG. 1

First, helium gas is introduced into the vacuum chamber 11 from the gas inlet 19 while exhausting the vacuum chamber 11 by the use of the rotary pump 12 to prepare an atmosphere of rare gas ($2/3$ atmospheric pressure) in the vacuum chamber 11. A refrigeration medium is flowed through the cooling tube 21 to cool inside of the vacuum chamber.

Next, the metal-added carbon electrodes 13, 14 are contacted each other by using the position controlling apparatuses 15, 16, and an AC voltage is applied between the metal-added carbon electrodes 13, 14 by using the discharge power source 17. Then, the electrodes 13, 14 are drawn apart by using the position controlling apparatus to generate arc discharge.

Metal and carbon are evaporated at the same time from each electrode 13, 14 by arc discharge. And, it may be considered that evaporation of metal and carbon from the electrode 13 takes place actually simultaneously with that from the electrode 14 since an AC voltage is applied.

Two kinds of metals evaporated from the two electrodes 13, 14 are alloyed in the vacuum chamber 11 and act as a catalyst to the carbon evaporated from the two electrodes 13, 14 to prepare the single layer carbon nano-tube.

Here, the rate of evaporation of metal from each electrode 13, 14 may be controlled by changing a waveform of electric current. In order to change the waveform of electric current, it may be preferable, for example, to control the timing of polarity inversion of the AC voltage applied to the electrodes. That is to say, while the polarity is inverted every ½ period in case of usual AC voltage, it may be preferable to invert the polarity repeatedly in unequal timing (for example, ⅓ period and ½ period) when the rate of evaporation of metal is changed. Thereby, it is possible to lengthen the time during which the discharge electric current from one electrode to the other electrode per one period than that from the other electrode to one electrode. The waveform of electric current at that time can be confirmed by means of the digital oscilloscope 18.

When the ratio of evaporation of metal from the electrodes 13, 14 is changed in such a manner as described above, the ratio of change of evaporated carbon to the single layer carbon nano-tube changes. Accordingly, the composition of metal catalyst is controlled so that the preparation efficiency of the single layer carbon nano-tube comes to the most high. According to experiments by the present inventors, it may be presumed that the purity of the single layer carbon nano-tube in the soot becomes high not in complete AC but rather when approaching DC to a certain degree, that is to say, when the time during which the discharge electric current flows from one electrode to the other electrode is lengthened to a certain degree and the time during which the discharge electric current flows from the other electrode to one electrode is shortened to a certain degree. And, there is a possibility that the frequency of DC influences the purity of the single layer carbon nano-tube in the soot.

The soot containing the single layer carbon nano-tube appears on inside walls of the vacuum chamber 11 (correctly, mainly on the surface of the cooling tube 31, hereinafter referred to as "chamber wall"). The soot which appeared on the chamber wall is scraped off from the chamber wall after the completion of the discharge and is recovered by means of the soot collecting filter 22.

Figure 2A:
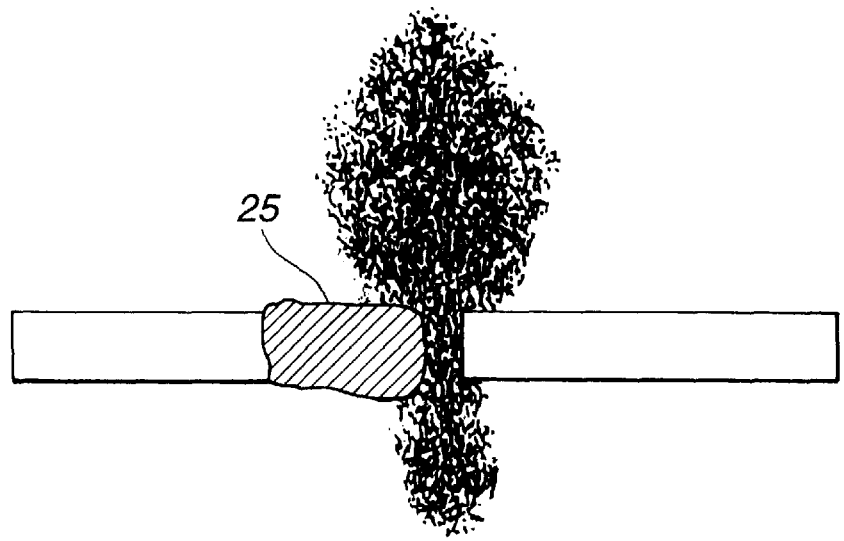
FIG. 2(a) is a pictorial view showing a state of periphery of electrodes according to conventional DC arc discharge, and (b) is a pictorial view showing a state of the periphery of the electrodes according to this invention.
Figure 2B:
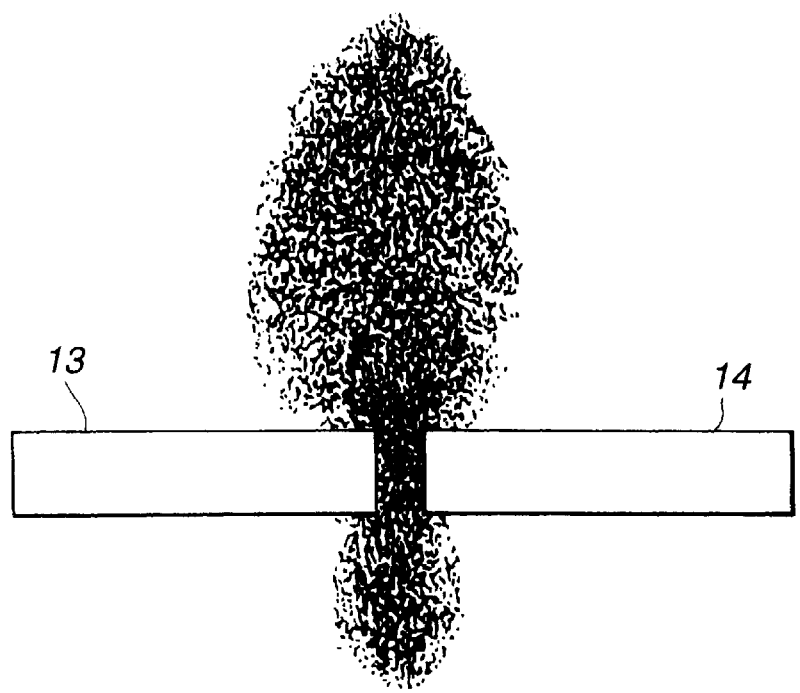

In this embodiment, since AC discharge is used, no deposit is build up at the electrodes, which is build up when DC discharge is used. This means that the carbon which is build up as deposits at the cathode as shown in FIG. 2(a) in a conventional method appears as soot containing the single layer carbon nano-tube. That is to say, by using the method according to this embodiment, no cathode deposit is build up at the electrodes as shown in FIG. 2(b) and soot containing the single layer carbon nano-tube can be obtained in large quantities than that by a conventional method.

And, since no deposit is build up at the electrodes in this embodiment of this invention, stable discharge can be realized over a long period of time.

Further, since two kinds of metal catalysts are used and the ratio of existence thereof can be controlled in this embodiment of this invention, the high efficiency of preparation of the single layer carbon nano-tube can be realized.

And further, in this embodiment of this invention, even if there is a metal-added carbon electrode to which one kind of metal is added, alloying effect can be obtained by placing oppositely thereto a metal-added carbon electrode to which a metal the kind of which is different from that of the former is added, and this invention is therefore more advantageous than the conventional method (DC arc discharge) by which an alloying effect can be obtained only when two kinds of metals-added carbon electrode is used.

Next, an explanation on the second embodiment of this invention is given below.

Also in the second embodiment, the arc discharging apparatus shown in FIG. 1 is used providing that metal-added carbon electrodes to which the metal of the same kind is added respectively are used as the metal-added carbon electrodes 13,14. Metals to be added are, for example, nickel and iron, or nickel and yttrium oxide for each electrode 13, 14.

The single layer carbon nano-tube can be prepared in high efficiency according to a method similar to that of the first embodiment by using such the electrodes as described above. The preparation efficiency of the single layer carbon nano-tube according to this embodiment is higher than that according to the first embodiment and can be more increased by controlling the waveform of discharge electric current. The control of the waveform of discharge electric current herein is carried out, for example, by lengthening the time during which the discharge electric current flows from the electrode 14 to the electrode 13 than that from the electrode 13 to the electrode 14 at each period (changing anode time ratio). And, there is a possibility that the preparation efficiency of the single layer carbon nano-tube which is lowered by AC frequency is influenced.

While an explanation is given on the case where two kinds of metals are used for the aforesaid first and second embodiment, it is not objectionable to use more than three kinds of metals. In this case, the metals which are added to one electrode and to the other electrode may contain partly a common metal, and may be common in all metals, or may not contain a common metal at all. Further, it is not objectionable to use for one electrode a metal-added carbon electrode to which plural metals are added and to use for the other electrode a metal-added carbon electrode to which pure carbon is added.

And, while nickel and iron, or nickel and yttrium (yttrium oxide), nickel and lanthanum (lanthanum oxide) are used in the aforesaid first and second embodiment, may be used other metals, for example, cobalt, rhodium, palladium, platinum, lanthanum, cerium, praseodymium, neodymium, gadolinium, terbium, dysprosium, holmium, erbium, and ruthenium in proper combination thereof. Elements except for metals may be added, like a combination of cobalt with sulfur.

This invention is explained in greater detail herein in the following examples, which are illustrative and not to be taken as limiting of this invention. In the following examples, was used a metal-added carbon electrode of 10 mm diameter and 75 mm length made by TOYO CARBON CORP. And, the flow rate of He (helium) and back pressure are maintained 500 cc/cm and $4-6\times10^{-3}$ Torr, respectively so that He pressure inside of the vacuum chamber is 500 Torr.

EXAMPLE 1

A Ni-added (3.2 wt %) carbon electrode and a Fe-added (3.0 wt %) carbon electrode were used as electrodes. AC arc discharge was carried out for nine minutes in discharge electric current of AC 300 A (52 Hz) and in anode time ratio of Fe:Ni=5:5 (the ratio of the time until when each electrode is an anode, in this case complete AC). Discharge voltage at this time was 34–35V.

As a result, Fe-added carbon electrode and Ni-added carbon electrode were consumed by 2.45 g and 1.56 g, respectively (original weights thereof were lost). It can be determined from this fact that the average evaporation rate of Fe-added carbon electrode is 0.273 g/min and that of Ni-added carbon electrode is 0.173 g/min.

The soot adherent to the chamber wall was hardly brittle to become a state of grated yam, since the soot containing the single layer carbon nano-tube in high quantity hardly crumbles. The recovery amount of the soot (crude single layer carbon nano-tube) was 3.30 g. When the recovery rate of soot was expressed by a equation: recovery rate=weight of soot recovered /amount of raw materials consumed, the recovery rate was 83% (loss rate was 17%).

Figure 3:
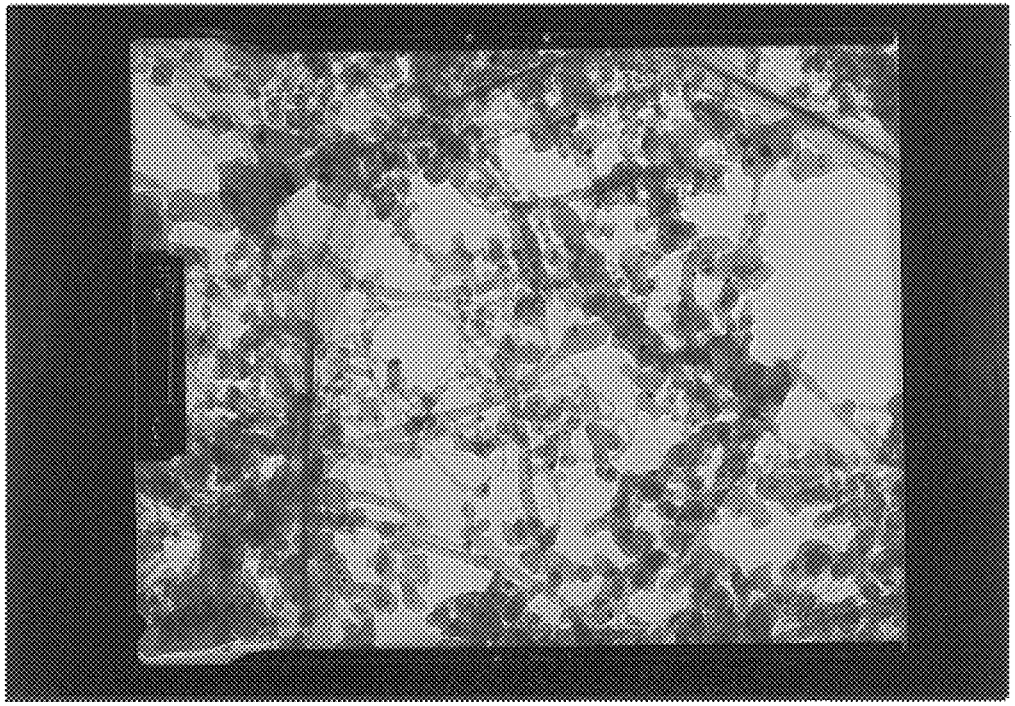
FIG. 3 is a photomicrograph of soot obtained according to the first example of this invention by a transmission-type electron microscope.

A photomicrograph of soot obtained at this time by a transmission-type electron microscope is shown in FIG. 3.

This photomicrograph was taken in cooperation with Mr. SAITO Yahachi, an assistant professor, the Department of Technology, MIE Univ. (the same is true for photomicrographs after Example 2 and later Examples).

While a change in evaporation rate due to deformation of the electrode is observed when the Fe-added carbon electrode and the Ni-added carbon electrode are placed oppositely like this Example, it may be considered that the change in evaporation rate can be controlled by an improvement of accuracy of positioning of the electrodes (axismating) and an increase in current density.

EXAMPLE 2

A Ni-added (3.2 wt %) carbon electrode and a $Y_2O_3$-added (5.6 wt %=reduced value on Y element (by ICP analysis)) carbon electrode were used as electrodes. AC arc discharge was carried out for six minutes in discharge electric current of AC 250A (52 Hz) and in anode time ratio of $Y_2O_3$:Ni=5:5. Discharge voltage lowered from 35 V to 26 V with the elapse of time. It is considered that the decrease in the discharge voltage results from a decrease in resistance, since the electrode is shortened due to evaporation from the electrode, while there may be scarely an influence of voltage drop.

As a result, the $Y_2O_3$-added carbon electrode and the Ni-added carbon electrode were consumed by 6.19 g and 3.83 g, respectively. Accordingly, the average evaporation rate of the $Y_2O_3$-added carbon electrode is 1.03 g/min and that of the Ni-added carbon electrode is 0.638 g/min. The recovery amount of the soot was 6.53 g. The recovery rate of soot was 65% (loss rate was 35%).

Figure 4:
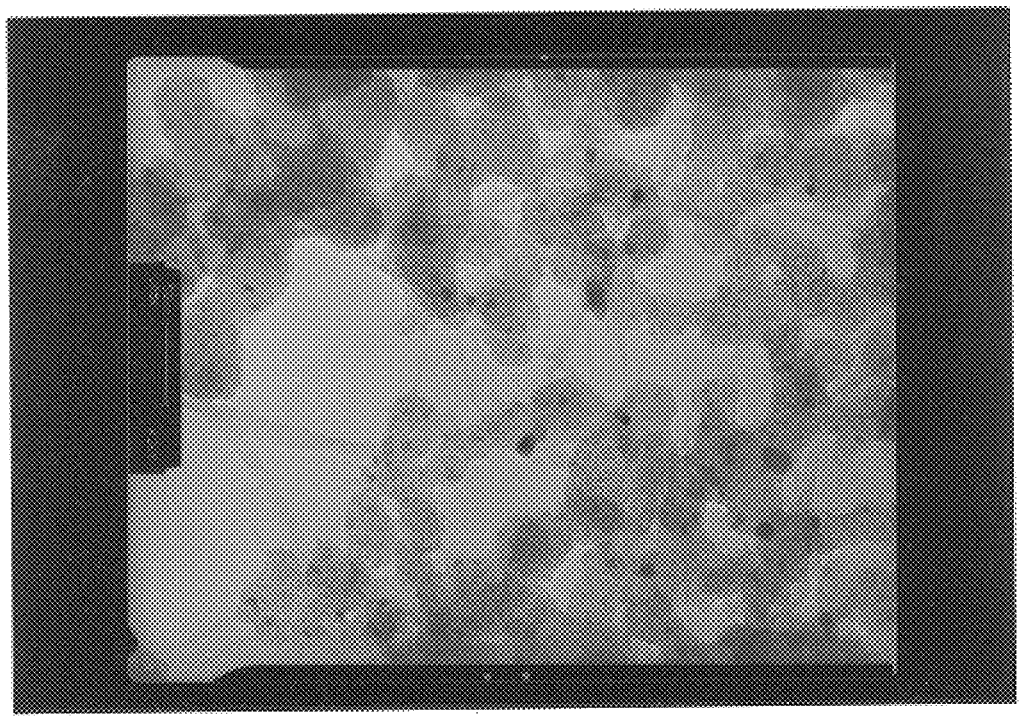
FIG. 4 is a photomicrograph of soot obtained according to the second example of this invention by a transmission-type electron microscope.

The soot recovered was easily brittle and the single layer nano-tube was slightly observed from chamber soot by observation by a transmission-type electron microscope. A photomicrograph of soot obtained at this time by a transmission-type electron microscope is shown in FIG. 4.

EXAMPLE 3

AC arc discharge was carried out for five minutes by using the same electrodes and discharge electric current as those of Example 2 and in anode time ratio of $Y_2O_3$:Ni=4:6. Discharge voltage lowered from 33 V to 31 V since the electrodes was shortening due to evaporation of electrodes.

As a result, the $Y_2O_3$-added carbon electrode and the Ni-added carbon electrode were consumed by 2.18 g and 5.38 g, respectively. Accordingly, the average evaporation rate of the $Y_2O_3$-added carbon electrode was 0.44 g/min and that of the Ni-added carbon electrode was 1.08 g/min.

Figure 5:
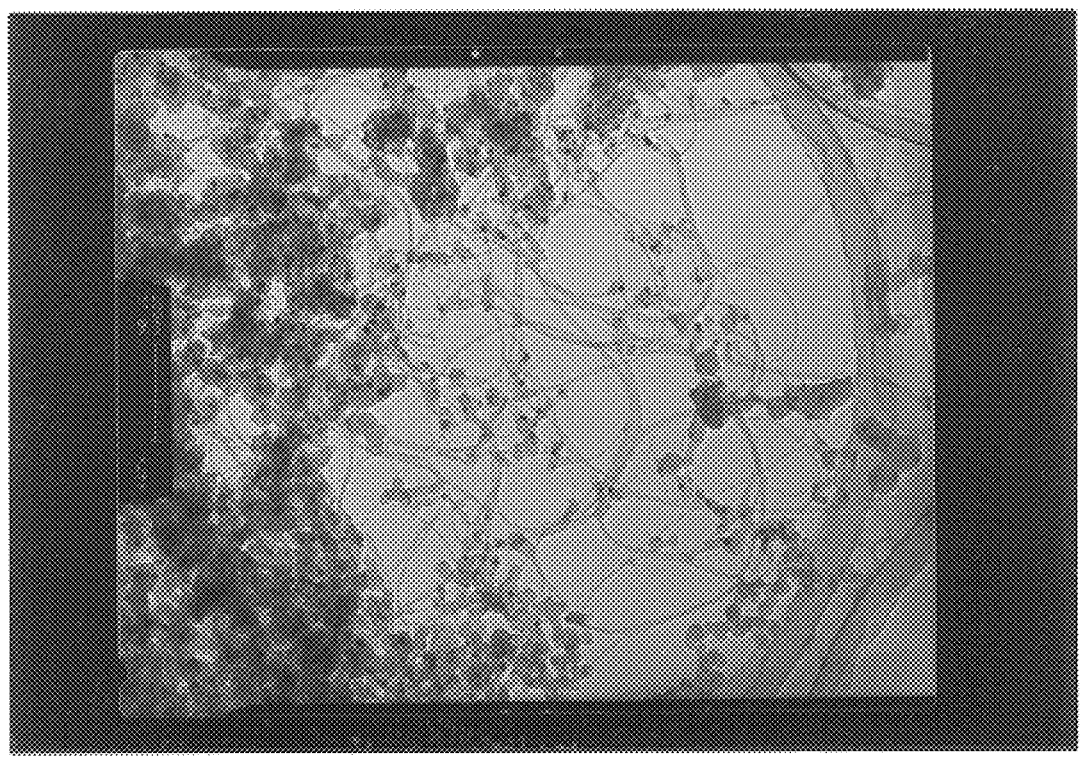
FIG. 5 is a photomicrograph of soot obtained according to the third example of this invention by a transmission-type electron microscope.

The soot adherent to the walls of chamber crumbles hardly. The recovery amount of the soot was 6.57 g and the recovery rate of soot was 87% (loss rate was 13%). A photomicrograph of the soot obtained at this time by a transmission-type electron microscope is shown in FIG. 5.

Comparing Example 2 with Example 3, it is understood that the purity of the single layer nano-tube in the soot recovered can be increased by changing the anode time ratio to lengthen the other (by changing the waveform of discharge electric current).

Taking into consideration that, the diameter of the single layer carbon nano-tube is significantly thicker than that according to this Example when only yttrium ($Y_2O_3$) is used as a metal to be added to the electrodes and any single layer carbon nano-tube is scarcely observed from the soot adherent to the chamber wall (it is observed from the soot adherent to the surface of the cathode) when only nickel is used solely, by using the conventional method in which DC arc discharge is used, it is presumed that an alloy of yttrium and nickel act as a catalyst in this Example, since the nickel-originated single layer carbon nano-tube was easily observed from the soot adherent to walls of the chamber.

EXAMPLE 4

Two carbon electrodes to which Ni (3.74 mol %) and $Y_2O_3$ (0.90 mol %) were added at the same time ware used as electrodes. AC arc discharge was carried out for five minutes and 30 seconds under conditions that discharge electric current was AC 250A (52 Hz) and anode time ratio was 5:5. Discharge voltage lowered from 36 V to 26 V with the elapse of time.

As a result, one electrode was consumed by 7.00 g and the other electrode was consumed by 6.15 g. That is to say, the average evaporation rate of one electrode was 1.26 g/min and that of the other electrode was 1.14 g/min.

The recovery amount of the soot was 8.84 g, the recovery rate of soot was 67% loss rate was 33%). The soot recovered was easily brittle.

EXAMPLE 5

AC arc discharge was carried out for three minutes and thirty seconds by using the same electrodes and discharge electric current as those of Example 4 and in anode time ratio of one electrode to the other electrode=6:4. Discharge voltage was 27–28 V.

As a result, one electrode was consumed by 7.54 g and the other electrode was consumed by −1.93 g (increase by growth of cathode deposits). Accordingly, the average evaporation rate of one electrode was 2.15 g/min and that of the other electrode was −0.55 g/min.

The soot adherent to the chamber was hardly brittle. The recovery amount of the soot was 4.19 g, and the recovery rate of soot was 26%. Therefore, the loss rate was 18%.

The cathode deposits did not grow longitudinally along the electrode, but became a state of bugle of 20 mm diameter so as to surround the tip of the electrode.

Comparing Example 4 with Example 5, it is understood that the purity of the single layer nano-tube in the soot recovered can be increased by changing anode time ratio to lengthen the other (by changing the waveform of discharge electric current).

EXAMPLE 6

AC arc discharge was carried out for two minutes and thirty seconds by using the same electrodes and discharge electric current as those of Example 4 and in anode time ratio of one electrode to the other electrode=8:24. Discharge voltage was 28 V As a result, one electrode was consumed by 7.64 g and the other electrode was consumed by −3.74 g (increase by growth of cathode deposits). Accordingly, the average evaporation rate of one electrode was 3.05 g/min and that of the other electrode was −1.50 g/min.

The soot adherent to the chamber was hardly brittle. The recovery amount of the soot was 2.97 g, and the recovery rate of soot was 39%. The recovery amount of the cathode deposits was 3.74 g, and its recovery rate was 49%. Therefore, the loss rate was 12%. The shape of the cathode deposits was cylinder of 1.7 mm outer diameter.

EXAMPLE 7

A Fe-added (3.0 wt %) carbon electrode, and a Ni (3.74 mol %) and $Y_2O_3$ (0.90 mol %)-added carbon electrode were used as electrodes. AC arc discharge was carried out for six minutes under conditions that discharge electric current was fAC 250A (52 Hz) and anode time ratio was Fe:Ni—$Y_2O_3$= 6:4. During this time, discharge voltage lowered from 30 V to 24 V with the elapse of time.

As a result, the Fe-added electrode was consumed by 5.12 g and the Ni—$Y_2O_3$-added electrode was consumed by −0.35 g (not only evaporation takes place but also the cathode deposits grow). Accordingly, the average evaporation rate of the Fe-added electrode was 0.87 g/min and that of the Ni—$Y_2O_3$-added electrode was −0.06 g/min.

The soot of the chamber was hardly brittle and the recovery amount of the soot was 4.12 g. The recovery rate of soot was 79%. The loss rate in this Example was 15%, since the increasing rate of the cathode was 6%.

EXAMPLE 8

A La-added carbon electrode and a Ni-added carbon electrode were used as electrodes. A $La_2O_3$-added electrode (outer diameter was 10 mm, length was 75 mm and reduced value on La element was 9.3 wt % (by IPC analyzing method)) made by TOYO CARBON CORP. was used as the La-added carbon electrode.

AC arc discharge was carried out for six minutes under conditions that discharge electric current was AC 250 A (52 Hz), and anode time ratio was La:Ni=4:6. Discharge voltage was 33–35V As a result, the La-added electrode was consumed by 0.64 g and the Ni-added electrode was consumed by 5.83 g. Accordingly, the average evaporation rate of the La-added electrode was 0.11 g/min and that of the Ni-added electrode was 0.97 g/min.

The soot adherent to the chamber was somewhat hardly brittle and the recovery amount of the soot was 5.15 g. The recovery rate of soot was 80%. The loss rate in this Example was 20%.

EXAMPLE 9

As an electrode was used a pipe-shaped carbon electrode made by KOJUNDO KAGAKU KENKYUJO CORP. (5N, 10 mm of outer diameter, 6 mm of inner diameter, 75 mm of length) a hollow part of which was filled with the following powders. That is to say, powders which were prepared by mixing equal weight of yttrium oxide (99.9% of purity, 2–3 microns of diameter), pure nickel (99.9% of purity, 100 of shape size), and pure carbon (99.99% of purity, 10 microns) which are all made by KOJUNDO KAGAKU KENKYUJO CORP. was charged into the hollow of the pipe-shaped electrode to be used. The weight of the pipe-shaped electrode was 6.7–6.9 g, and was 9.6–9.9 g when the aforesaid powder was charged.

Figure 6A:
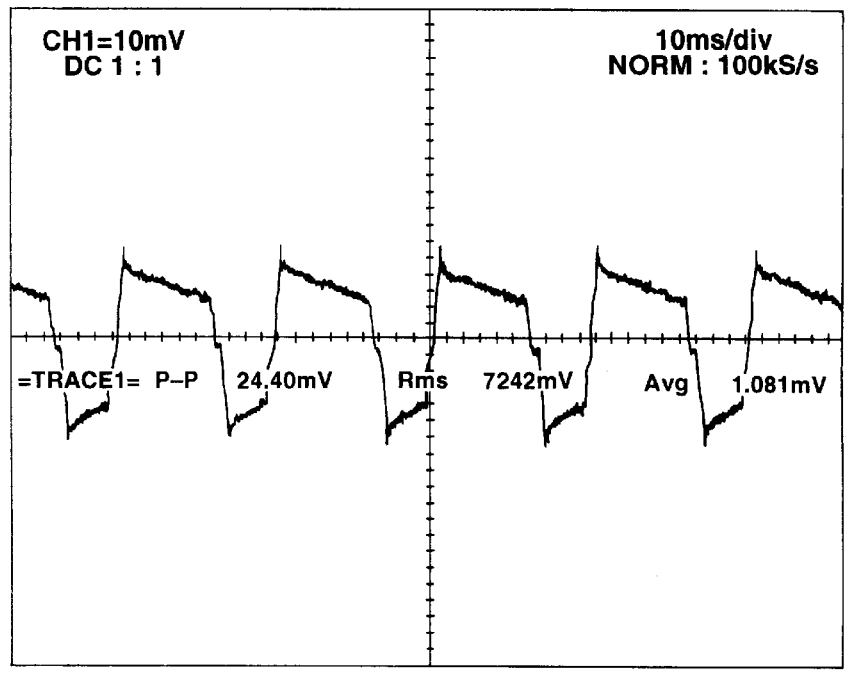
FIG. 6(a) is a chart showing a waveform of discharge current of AC arc discharge according to the ninth example of this invention, and (b) is a chart showing a waveform of discharge voltage of AC arc discharge according to the ninth example of this invention.
Figure 6B:
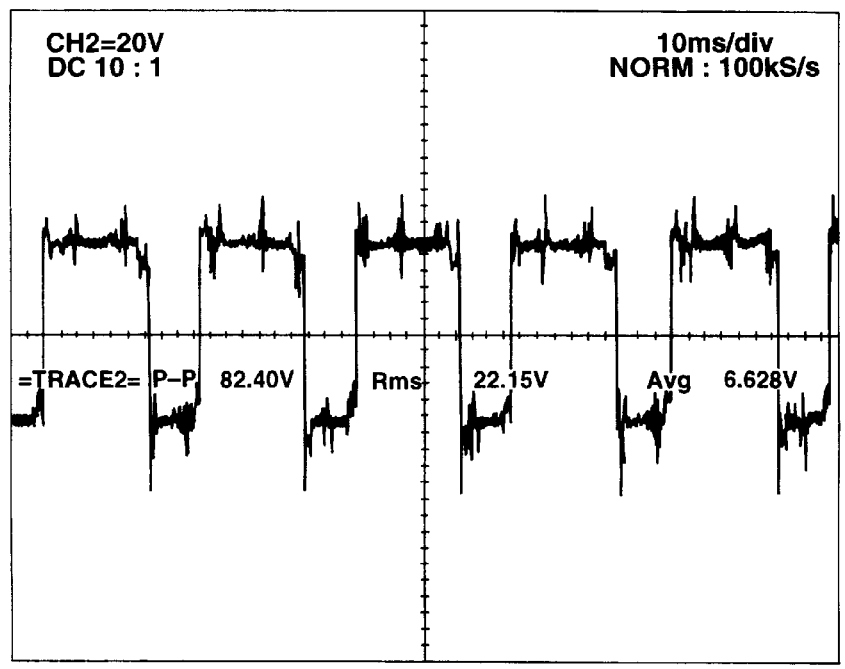

AC arc discharge was carried out for 12 minutes and 30 seconds under conditions that discharge electric current was AC 180A (52 Hz), and anode time ratio was one electrode: the other electrode=6:4. The waveforms of electric current and voltage are shown in FIG. 6(a) and (b), respectively. FIG. 6(a) shows a change in electric current as a change in electric voltage generated at both ends of reference resistance.

As a result, one electrode was consumed by 6.43 g and the other electrode was consumed by −3.10 g (cathode deposits were grown). Accordingly, the average evaporation rate of one electrode was 0.51 g/min and that of the other electrode was −0.25 g/min.

The soot adherent to the chamber was extremely hardly brittle and the recovery amount of the soot was 2.48 g (recovery amount of cathode deposits was 3.10 g), the recovery rate of soot was 39% (recovery rate of cathode deposits was 48%). The loss rate in this Example was 13%. The cathode deposits were in the shape of deep plate of 15 mm outer diameter having a recess on the top thereof.

Comparative Example

A Ni (3.74 mol %) and $Y_2O_3$ (0.90 mol %)-added carbon electrode was used as an anode, and a pure carbon electrode of 5N (99.999%) made by KOJUNDO KAGAKU KENKYUUJO CORP. (10 mm of diameter, 75 mm of length) was used as a cathode. AC arc discharge was carried out for five minutes and 30 seconds by the use of He as rare gas at a pressure of 500 Torr and at a rate of 500 c/cm under conditions that discharge electric current was DC 150A and discharge voltage was 25–26V.

As a result, the consumption amount of the anode electrode was 8.55 g, the volume amount of the cathode electrode was 5.31 g, the average evaporation rate of the anode electrode was 1.55 g/min and that of the cathode was 0.97 g/min. And soot which was hardly brittle was obtained from the chamber walls, however, the recovery amount of the soot was 2.42 g and the recovery rate of soot was 28%. And, pipe-shaped cathode deposits (12 mm of outer diameter, 3 mm of inner diameter) were grown on the cathode, and the recovery amount of the cathode deposits was 5.31 g and the recovery rate thereof was 62 wt %.

According to this invention, in a method for preparing the single layer carbon nano-tube, even if the carbon evaporated from one electrode adheres to the other electrode, the polarity is inverted at the next moment because of using AC arc discharge and the evaporation of carbon generates from the other electrode, and, simultaneously, the carbon adherent to the other electrode evaporates, and, therefore, no deposits grow on the electrodes (or the rate of growth is controlled) and the single layer carbon nano-tube can be obtained in a large quantity.

And according to this invention, in a method for preparing a single layer carbon nano-tube, since no deposits grow on the electrodes (or the rate of growth is controlled) and stable discharge can be continued because of using AC arc discharge, the single layer carbon nano-tube can be prepared stably for a long period of time.

Further, according to this invention, since the electrodes to which plural metals are added are used and AC arc discharge is effected between these electrodes, the single layer carbon nano-tube can be prepared in high efficiency.

And further, according to this invention, since the waveform of discharge electric current (the ratio of anode electrode) can be controlled, the single layer carbon nano-tube can be prepared in high efficiency.

What is claimed is:

1. A method for preparing a single layer carbon nano-tube comprising generating arc discharge between two carbon electrodes to evaporate said carbon electrodes and generating soot containing the single layer carbon nano-tube in an atmosphere of a gas, characterized in that a metal-added carbon electrode to which more than two kinds of metals in all are added is used for one or both electrodes as said two carbon electrodes and an alternating voltage is applied between said two electrodes to generate AC arc discharge.

2. A method for preparing a single layer carbon nano-tube according to claim 1, characterized in that metals are added only to one carbon electrode of said two carbon electrodes and the other carbon electrode is a pure carbon electrode.

3. A method for preparing a single layer carbon nano-tube according to claim 1, characterized in that metals are added to both carbon electrodes of said two carbon electrodes and at least one kind of metal of metals added to one carbon electrode is different in kind from metals added to the other carbon electrode.

4. A method for preparing a single layer carbon nano-tube according to claim 1, characterized in that metals are added to both carbon electrodes of said two carbon electrodes and metals added to one carbon electrode and to the other carbon electrode are the same metals containing plural kinds of metals.

5. A method for preparing a single layer carbon nano-tube according to claim 3 or 4, characterized in that a ratio of evaporation rate of said metals from one carbon electrode of said two carbon electrodes to evaporation rate of said metals from the other carbon electrode of said two carbon electrodes is changed by controlling discharge electric current flowing between said two carbon electrodes.

6. A method for preparing a single layer carbon nano-tube according to any one of claims 2, 3 and 4, characterized in that said AC voltage is controlled so that the time during which the discharge electric current flows from one carbon electrode to the other carbon electrode of said two carbon electrodes is lengthened than the time during which the discharge electric current flows from the other carbon electrode of said two carbon electrodes to one carbon electrode at each period.

* * * * *